(12) United States Patent
Kishiyama et al.

(10) Patent No.: US 8,902,819 B2
(45) Date of Patent: Dec. 2, 2014

(54) MOBILE TERMINAL APPARATUS AND RADIO COMMUNICATION METHOD

(75) Inventors: Yoshihisa Kishiyama, Tokyo (JP); Nobuhiko Miki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 34 days.

(21) Appl. No.: 13/704,249

(22) PCT Filed: Jun. 21, 2011

(86) PCT No.: PCT/JP2011/064127
§ 371 (c)(1),
(2), (4) Date: Mar. 20, 2013

(87) PCT Pub. No.: WO2011/162235
PCT Pub. Date: Dec. 29, 2011

(65) Prior Publication Data
US 2013/0176924 A1 Jul. 11, 2013

(30) Foreign Application Priority Data
Jun. 21, 2010 (JP) ................. 2010-141020

(51) Int. Cl.
| | | |
|---|---|---|
| *H04W 4/00* | (2009.01) | |
| *H04L 1/16* | (2006.01) | |
| *H04W 72/04* | (2009.01) | |
| *H04L 1/00* | (2006.01) | |
| *H04B 7/00* | (2006.01) | |
| *H04L 1/18* | (2006.01) | |
| *H04W 28/04* | (2009.01) | |

(52) U.S. Cl.
CPC ......... *H04W 72/0413* (2013.01); *H04L 1/1607* (2013.01); *H04L 1/1614* (2013.01); *H04W 28/04* (2013.01); *H04L 1/0072* (2013.01)
USPC ............................ 370/328; 370/277; 714/748

(58) Field of Classification Search
CPC ....................................................... H04L 5/0053
See application file for complete search history.

(56) References Cited

U.S. PATENT DOCUMENTS

| | | | |
|---|---|---|---|
| 7,929,415 B2 | 4/2011 | Kwak et al. | |
| 2009/0279460 A1* | 11/2009 | Sarkar | 370/280 |
| 2011/0243066 A1* | 10/2011 | Nayeb Nazar et al. | 370/328 |
| 2012/0008585 A1* | 1/2012 | Kwon et al. | 370/329 |
| 2012/0106569 A1* | 5/2012 | Che et al. | 370/437 |

(Continued)

FOREIGN PATENT DOCUMENTS

| | | |
|---|---|---|
| JP | 2010-519879 A | 6/2010 |
| WO | 2009/137646 A2 | 11/2009 |

OTHER PUBLICATIONS

Japanese Office Action w/translation for corresponding Japanese Application No. 2010-141020 mailed Jan. 22, 2013 (6 pages).

(Continued)

*Primary Examiner* — Clemence Han
(74) *Attorney, Agent, or Firm* — Osha Liang LLP (57) ABSTRACT

To provide a mobile terminal apparatus and radio communication method for enabling feedback control information to be efficiently transmitted on a physical uplink control channel, a mobile terminal apparatus of the invention receives downlink shared data channels parallel in a plurality of CCs, makes determinations on the downlink shared data channels about ACK/NACK/DTX, collectively codes determination results (states) of the plurality of CCs after reducing the number of states allowed to be notified individually, and performs signal processing on the coded data to be orthogonalized between users to transmit.

9 Claims, 9 Drawing Sheets (56) References Cited

U.S. PATENT DOCUMENTS

| | | | | |
|---|---|---|---|---|
| 2012/0113913 | A1* | 5/2012 | Tiirola et al. | 370/329 |
| 2012/0120926 | A1* | 5/2012 | Chen et al. | 370/336 |
| 2012/0213187 | A1* | 8/2012 | Yang et al. | 370/329 |
| 2012/0327885 | A1* | 12/2012 | Chung et al. | 370/329 |
| 2013/0010690 | A1* | 1/2013 | Cheng et al. | 370/328 |
| 2013/0329678 | A1* | 12/2013 | Pan et al. | 370/329 |
| 2014/0016522 | A1* | 1/2014 | Ahn et al. | 370/280 |
| 2014/0016600 | A1* | 1/2014 | Kim et al. | 370/329 |

OTHER PUBLICATIONS

Written Opinion of the International Searching Authority issued in PCT/JP2011/064127 mailed on Sep. 27, 2011 (6 pages).

International Preliminary Report on Patentability from PCT/JP2011/064127 issued on Jan. 15, 2013 (7 pages).

Office Action for corresponding Japanese Application No. 2010-141020, mailed Sep. 3, 2013 (6 pages).

International Search Report issued in PCT/JP2011/064127 mailed Sep. 27, 2011 (4 pages).

NTT Docomo; "Uplink ACK/NAVK Transmission Schemes for Carrier Aggregation"; 3GPP TSG RAN WG1 Meeting #61, R1-103248; Montral, Canada; May 10-14, 2010 (3 pages).

LG Electronics Inc.; "Investigation on problems in case of PUCCH and S-RS simultaneous transmission"; 3GPP TSG RAN WG1 #49bis, R1-072887; Orlando, FL, USA; Jun. 25-29, 2007 (7 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

|  | 1CW | 2CWs |
|---|---|---|
| 00 | DTX | NACK/NACK or DTX |
| 01 | NACK | NACK/ACK |
| 10 | ACK | ACK/NACK |
| 11 | — | ACK/ACK |

MOBILE TERMINAL APPARATUS AND RADIO COMMUNICATION METHOD

TECHNICAL FIELD

The present invention relates to a mobile terminal apparatus and radio communication method in the next-generation mobile communication system.

BACKGROUND ART

In UMTS (Universal Mobile Telecommunications System) networks, for the purpose of improving spectral efficiency, peak data rates, etc., by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing spectral efficiency and peak data rates, reducing delay and the like, Long Term Evolution (LTE) has been studied (Non-patent Document 1). In LTE, as distinct from W-CDMA, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

Figure 1:
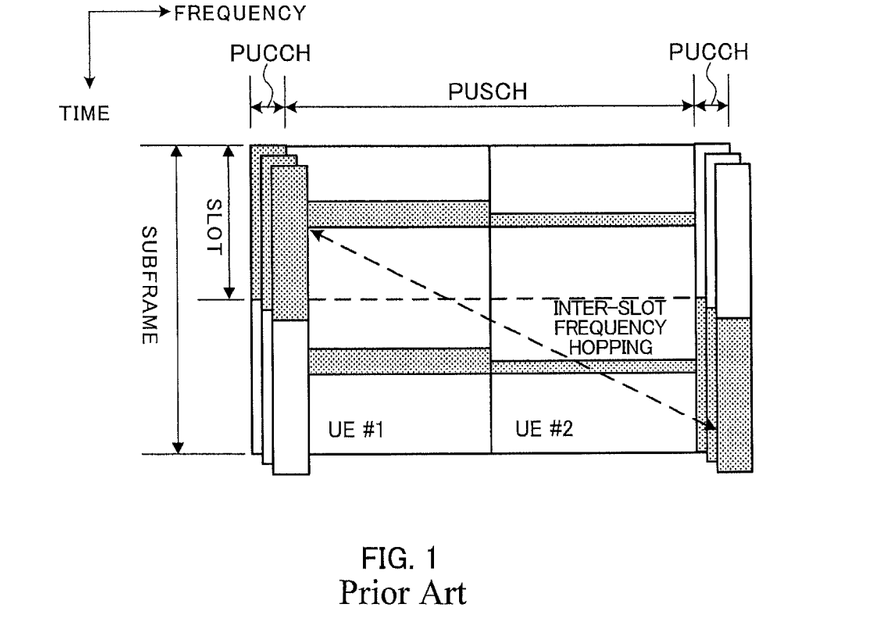
FIG. 1 is a diagram to explain a channel configuration to map an uplink signal.

As shown in FIG. 1, signals transmitted in uplink are mapped to appropriate radio resources, and are transmitted from a mobile terminal apparatus to a radio base station apparatus. In this case, user data (UE (User Equipment) #1, UE #2) is assigned to the uplink shared channel (PUSCH: Physical Uplink Shared Channel), and control information is time-multiplexed with the PUSCH when the control information is transmitted concurrently with the user data, while being assigned to the uplink control channel (PUCCH: Physical Uplink Control Channel) when only the control information is transmitted. The control information transmitted in uplink includes downlink quality information (CQI: Channel Quality Indicator), retransmission response (ACK/NACK) to the downlink shared channel, etc.

Figure 2A:
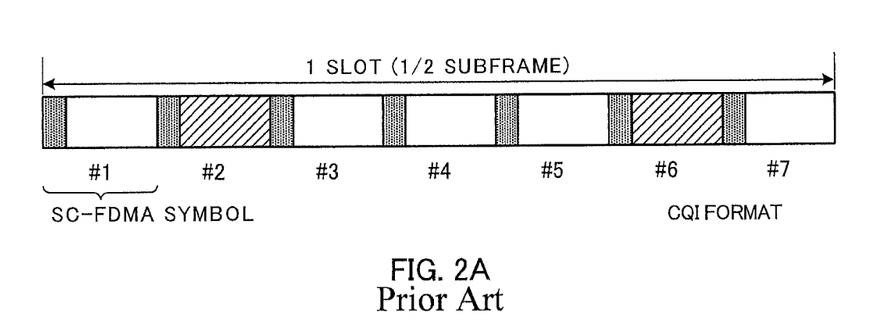
FIG. 2 contains diagrams illustrating physical uplink control channel formats.
Figure 2B:
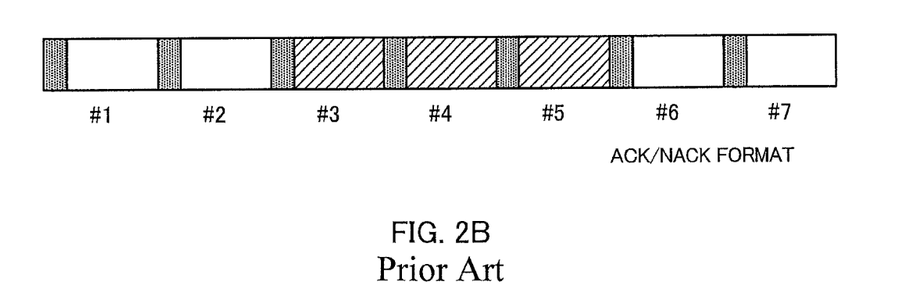

In the PUCCH, typically, different subframe structures are adopted between the case of transmitting the CQI and the case of transmitting ACK/NACK (FIGS. 2A and 2B). In the subframe structure of the PUCCH, one slot (1/2 subframe) contains 7 SC-FDMA symbols. Further, one SC-FDMA symbol contains 12 information symbols (subcarriers). More specifically, as shown in FIG. 2A, in the subframe structure (CQI format) of the CQI, a reference signal (RS) is multiplexed into a second symbol (#2) and sixth symbol (#6), and the control information (CQI) is multiplexed into the other symbols (first symbol, third to fifth symbols, seventh symbol) in a slot. Meanwhile, as shown in FIG. 2B, in the subframe structure (ACK/NACK format) of ACK/NACK, a reference signal (RS) is multiplexed into third symbol (#3) to fifth sixth symbol (#5), and the control information (ACK/NACK) is multiplexed into the other symbols (first symbol (#1), second symbol (#2), sixth symbol (#6), seventh symbol (#7)) in a slot. In one subframe, the slot is repeated twice. Further, as shown in FIG. 1, the PUCCH is multiplexed into radio resources at opposite ends of the system band, and frequency hopping (Inter-slot FH) is applied between two slots having different frequency bands in one subframe. In the subframe structure of the PUSCH, one slot contains 7 SC-FDMA symbols.

CITATION LIST

Non-Patent Literature

[Non-patent Literature 1] 3GPP, TR25.912 (V7.1.0), "Feasibility study for Evolved UTRA and UTRAN", September 2006

SUMMARY OF THE INVENTION

Technical Problem

In the 3G system (W-CDMA), a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further improving spectral efficiency, peak data rates, etc. a successor system to LTE has been studied (for example, also called LTE Advanced or LTE enhancement (hereinafter, referred to as LTE-A)).

In the LTE-A system, for the purpose of further improving spectral efficiency, peak throughput, etc. assignments of frequencies with wider bands than in LTE have been studied. Further, in LTE-A (for example, Rel. 10), having Backward compatibility with LTE is one of requirements, and therefore, adopted is a configuration of a transmission band with a plurality of base frequency blocks (component carriers: CC) each having a bandwidth capable of being used in LTE. Therefore, the feedback control information for a data channel transmitted by a plurality of downlink CCs increases by number-of-CC times in a simplistic manner. Thus, since the information amount of the feedback control information increases, it is necessary to study transmission methods of feedback control information on uplink channels.

The present invention was made in view of such a respect, and it is an object of the invention to provide a mobile terminal apparatus and radio communication method for enabling feedback control information to be efficiently transmitted on a physical uplink control channel.

Solution to Problem

A mobile terminal apparatus of the invention is characterized by having a demodulation section configured to demodulate a downlink shared data channel signal, an ACK/NACK determining section configured to output, as a determination result, each state of ACK when the downlink shared data channel signal is received without error, NACK when an error is detected, and DTX when a downlink shared data channel signal is not detected, an ACK/NACK signal coding section configured to code states collectively for a plurality of base frequency blocks, the states which are output from the ACK/NACK determining section for each base frequency block in response to a plurality of downlink shared data channel signals received parallel in a plurality of base frequency blocks, after reducing the number of states allowed to be notified individually, and an ACK/NACK signal processing section configured to perform signal processing on coded data coded in the ACK/NACK signal coding section to be orthogonalized between users.

According to the present invention, since the apparatus reduces to the number of states allowed to be notified individually, and then, collectively codes a plurality of base frequency blocks, the apparatus is capable of controlling the maximum number of coded bits, and of efficiently transmitting feedback control information on a physical uplink control channel.

Technical Advantage of the Invention

According to the invention, it is possible to efficiently transmit feedback control information on a physical uplink control channel.

DESCRIPTION OF EMBODIMENTS

Embodiments of the invention will specifically be described below with reference to accompanying drawings.
[Notification Method of PDCCH Non-detection (DTX)]

In LTE (Rel. 8), in notification of ACK/NACK (Format 1a/1b) in response to a downlink data channel (PDCSH), it is possible to notify a plurality of states as described below.

There are three states of ACK, NACK and DTX in the case of one-codeword transmission, and there are five states of ACK/ACK, ACK/NACK, NACK/ACK, NACK/NACK and DTX (Discontinuous reception) in the case of two-codeword transmission.

Herein, DTX is a state in which a user terminal UE is not capable of receiving a PDCCH, and therefore, does not transmit any response in uplink (PDCCH non-detection state). A base station is capable of determining DTX when reception power in resources allocated to ACK/NACK in uplink is a predetermined value or less.

A codeword indicates a coding unit of channel coding (error correcting coding), and in applying MIMO multiplexing transmission, a single or a plurality of codewords is transmitted. In LTE, maximum two codewords are used in single-user MIMO. In the case of two-layer transmission, each layer is of an independent codeword, and in the case of four-layer transmission, every two layers are of one codeword.

In the case of transmitting PDSCHs using a plurality of CCs, when the user terminal UE tries to enable three states (one codeword) or five states (two codewords) to be notified, there is the problem that the maximum number of coded bits increases.

One aspect of the invention is a method of notifying ACK/NACK information for coding ACK/NACK information so as not to transmit information bits of DTX alone depending on the condition and reducing the maximum number of coded bits, in the case of performing joint-coding on the ACK/NACK information in response to a downlink data channel among a plurality of CCs to generate ACK/NACK information of a plurality of bits, and transmitting the ACK/NACK information of a plurality of bits in uplink.

(1) Notification of DTX is Switched Between ON/OFF Corresponding to the Number of Codewords.

In the case of one-codeword transmission, information bits are assigned individually to three states (ACK, NACK, DTX) per CC, and in the case of two-codeword transmission, information bits are assigned individually to four states (ACK/ACK, ACK/NACK, NACK/ACK, and NACK/NACK or DTX) per CC to notify so as not to assign information bits to DTX alone. In other words, coding and notification of DTX alone is performed only in the case of one codeword, and DTX is not notified in the case of two codewords.

Figure 3:
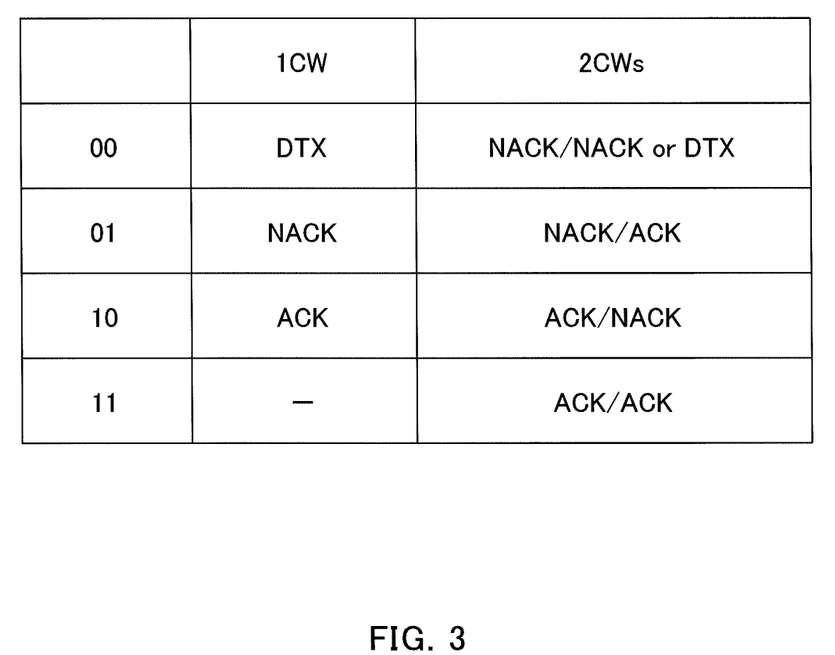
FIG. 3 is a diagram illustrating a coding table that defines coded data of ACK/NACK/DTX corresponding to the number of codewords.

FIG. 3 is a configuration example of a coding table applied to the notification method of DTX (PDCCH non-detection) of the invention.

In the case of one-codeword transmission, three states (ACK, NACK, DTX) per CC are defined, DTX is assigned information bits of "00", NACK is assigned information bits of "01", and ACK is assigned information bits of "10".

In the case of two-codeword transmission, four states (ACK/ACK, ACK/NACK, NACK/ACK, and NACK/NACK or DTX) per CC are defined, NACK/NACK or DTX is assigned information bits of "00", NACK/ACK is assigned information bits of "01", ACK/NACK is assigned information bits of "10", and ACK/ACK is assigned information bits of "11". In other words, in the case of two codewords, one kind of information bits (00) is assigned to the state of DTX or NACK/NACK, and the number of states is decreased. Coding is performed so as not to notify information bits for DTX alone. The base station repeats retransmission until ACK is notified in uplink.

By this means, in two-codeword transmission, since the number of states to notify is reduced to "4" (4 states), it is possible to decrease the maximum number of coded bits. For example, in the case that the number of CCs is "5" and that the number of states to notify is "4", the maximum number of coded bits is "10" (10 bits). As in the conventional scheme, in the case that the number of CCs is "5" and that the number of states to notify is "5", the maximum number of coded bits is "12" (12 bits), and therefore, it is possible to reduce by 2 bits.
(2) Notification of DTX is Switched Between ON/OFF Corresponding to the Number of CCs.

In the case that the number of CCs is X or less, five states (DTX is individually assigned information bits) are coded to enable notification in two-codeword transmission, and in the case that the number of CCs is more than X, four states (NACK/ACK or DTX is assigned common information bits) are coded to enable notification in two-codeword transmission. In other words, only in the case that that the number of CCs is X or less, DTX itself is coded and notified in uplink.

For example, in the case that the number of CCs is "4" or less, three states are notified in one-codeword transmission, and five states are notified in two-codeword transmission. In the case that the number of CCs is "4" and that the number of states to notify is "4", the maximum number of coded bits is "10" (10 bits). In the case that the number of CCs is more than "4", three states are notified in one-codeword transmission, and four states are notified in two-codeword transmission. In the case that the number of CCs is "5" and that the number of states to notify is "4", the maximum number of coded bits is "10" (10 bits).

Thus, notification of DTX alone is switched between ON/OFF according to the condition, and it is thereby possible to decrease the maximum number of coded bits in coding and transmitting the ACK/NACK information.

As described above, for the ACK/NACK information with the number of states reduced with the condition for each CC, a plurality of CCs is collectively coded for each user, and is transformed into ACK/NACK information of a plurality of bits. Uplink control information (ACK/NACK information, CQI information, reference signal (RS)) transmitted in uplink from each user terminal is multiplexed among users.

[Reduction Type Format Configuration with Simultaneous Transmission with SRS Considered]

Described herein are Physical Uplink Control Channel (PUCCH) formats used in orthogonal multiplexing. When uplink control channel signals of a plurality of users are multiplexed on the PUCCH, the uplink control channel signals are orthogonalized so that the radio base station apparatus is capable of dividing the uplink control channel signals for each user. As such an orthogonal multiplexing method, there are the orthogonal multiplexing method using the cyclic shift of CAZAC (Constant Amplitude Zero Correlation) code sequences, and the orthogonal multiplexing method using block spreading.

Figure 4A:
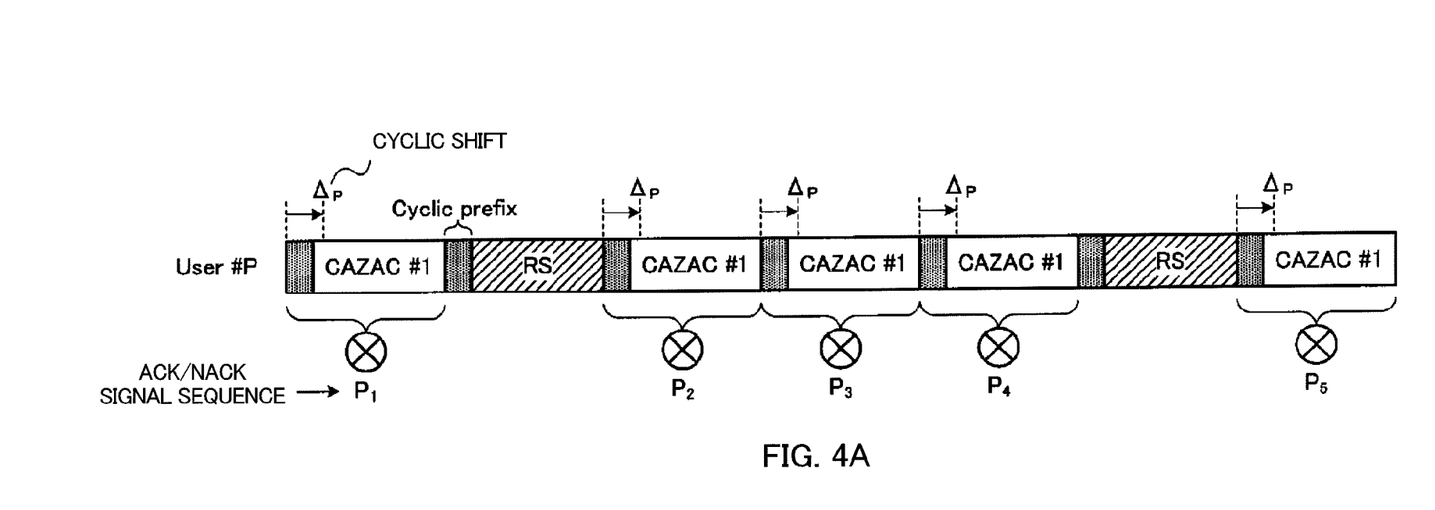
FIG. 4A is a diagram to explain orthogonal multiplexing on a CS (cyclic shift) base using CAZAC code sequences.

The orthogonal multiplexing method using the cyclic shift of CAZAC code sequences is an orthogonal multiplexing method employing the fact that sequence CAZAC#1($\Delta p$) obtained by cyclically shifting a CAZAC code sequence with code length L by $\Delta p$ is mutually orthogonal to sequence CAZAC#1($\Delta q$) obtained by cyclically shifting the CAZAC code sequence by $\Delta q$. Accordingly, in this method, with respect to SC-FDMA symbols to which are mapped CAZAC code sequences provided with varied shift amounts, by modulating (block modulation) the entire single SC-FDMA symbol with the control information, it is possible to orthogonally multiplex uplink control channel signals for each user. For example, as shown in FIG. 4A, in a subframe format (Format 2/2a/2b) to transmit the ACK/NACK information, the CAZAC code sequence with a particular cyclic shift amount ($\Delta$) is mapped to each SC-FDMA symbol. Then, block modulation is performed using uplink control signals (ACK/NACK signal sequences) $p_1$ to $p_5$ subjected to data modulation. By assigning different cyclic shift amounts for each user, it is possible to orthogonalize uplink control channel signals among users. By this means, the radio base station apparatus is capable of dividing the uplink control signals for each user. In addition, the interval of the cyclic shift of the CAZAC code sequence assigned to the user is preferably set to be longer than the maximum delay amount of multipath.

Figure 4B:
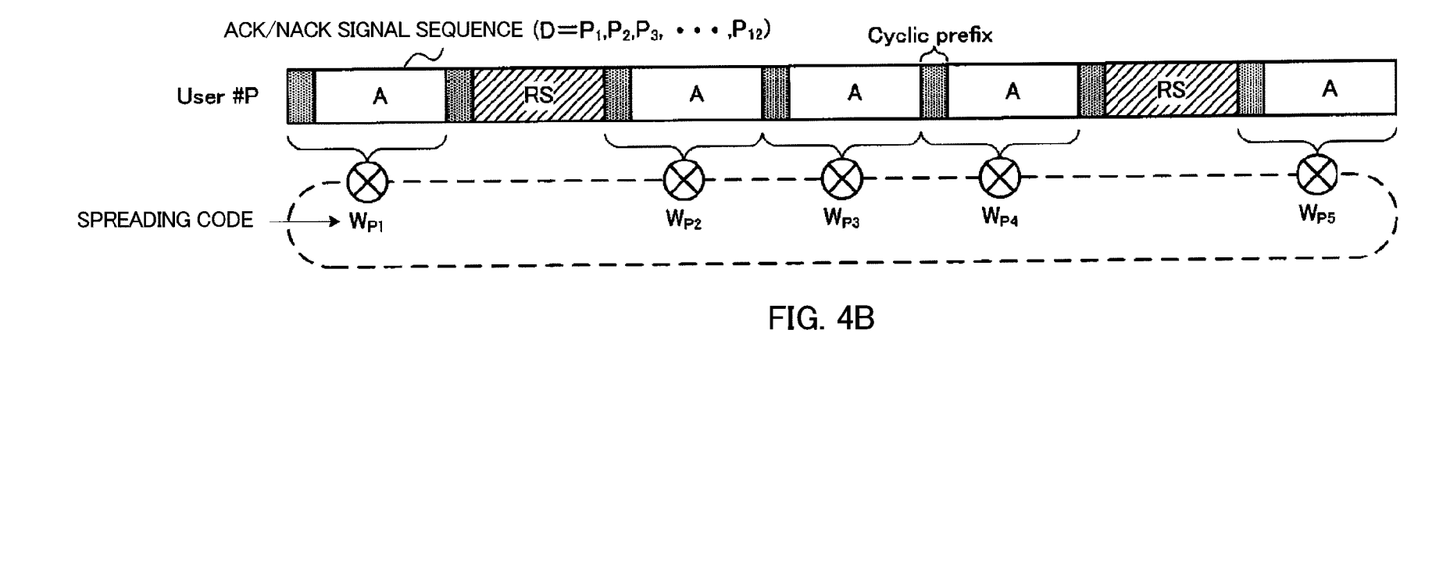
FIG. 4B is a diagram to explain orthogonal multiplexing on an OCC (orthogonal cover code) base.

Block spreading is an orthogonal multiplexing method for applying orthogonal codes (OCC: Orthogonal Cover Code) in the time domain. For example, as shown in FIG. 4B, a signal (ACK/NACK signal sequence) A in one SC-FDMA is replicated, and mapped to five SC-FDMA symbols (first symbol, third to fifth symbols, and seventh symbol). Further, spreading codes $W_{p1}$ to $W_{p5}$ are multiplied by entire SC-FDMA symbols (first symbol, second to fifth symbols, and seventh symbol). By using spreading codes (orthogonal codes) that are orthogonal between different users, it is possible to orthogonalize uplink control channel signals among users, and the radio base station apparatus is capable of dividing the uplink control channel signals for each user.

Another aspect of the invention is a method of notifying ACK/NACK information to maintain orthogonality among users in code multiplexing on a CS (Cyclic Shift) base by applying a reduction type format only to a user who simultaneously transmits ACK/NACK information of a plurality of bits and SRS (Sounding Reference Signal) for channel quality measurement in the same subframe, in the case of performing joint-coding on the ACK/NACK information in response to a downlink data channel among a plurality of CCs to generate the ACK/NACK information of a plurality of bits, and transmitting the ACK/NACK information of a plurality of bits in uplink.

Figure 5:
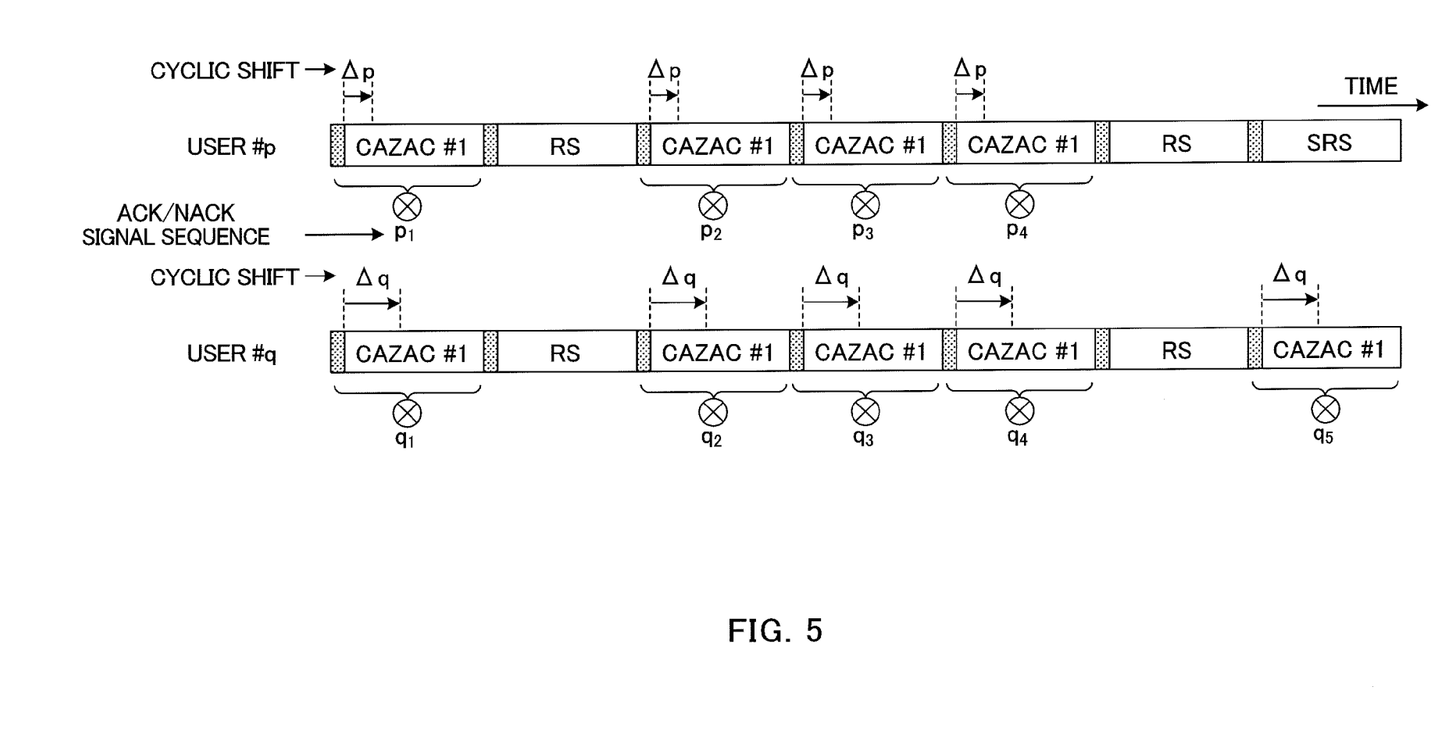
FIG. 5 is a diagram to explain inter-user orthogonality when SRS is multiplexed in code multiplexing on the CS (cyclic shift) base.

FIG. 5 is a conceptual diagram in which the ACK/NACK information is orthogonalized between users by code multiplexing on a CS base. To a user #p that simultaneously transmits the ACK/NACK information of a plurality of bits and SRS in the same subframe, applied is the (puncture) reduction type format with the last symbol for the ACK/NACK information in the subframe deleted, and the SRS is transmitted in the deleted last symbol position in the subframe. Meanwhile, to a user #q that does not simultaneously transmit the ACK/NACK information of a plurality of bits and SRS in the same subframe, applied is the normal format without the last symbol for the ACK/NACK information in the subframe being deleted.

For the same CAZAC code (with the same root sequence), different cyclic shifts $\Delta p$ and $\Delta q$ are assigned respectively to users #p and #q. The user #p maps the CAZAC sequence (cyclic shift $\Delta p$) to four symbols for ACK/NACK information of the reduction type format, and maps the SRS to the last symbol of the subframe. The user #q maps the CAZAC sequence (cyclic shift $\Delta q$) to five symbols for ACK/NACK information of the normal format. The CAZAC sequences mapped to the symbols for ACK/NACK information are block-modulated with data-modulated ACK/NACK signal sequences (UE #p=$p_1$ to $p_4$, UE #q=$q_1$ to $q_5$), respectively.

By this means, in the case of orthogonalizing the ACK/NACK information among users by code multiplexing on a CS base, it is possible to map the SRS to the same subframe to transmit, while maintaining orthogonality among users.

Still another aspect of the invention is a method of notifying ACK/NACK information to maintain orthogonality among users in code multiplexing on an OCC base by applying a reduction format only to a user who simultaneously transmits ACK/NACK information of a plurality of bits and SRS for channel quality measurement in the same subframe, in the case of performing joint-coding on the ACK/NACK information in response to a downlink data channel among a plurality of CCs to generate the ACK/NACK information of a plurality of bits, and transmitting the ACK/NACK information of a plurality of bits in uplink.

Figure 6:
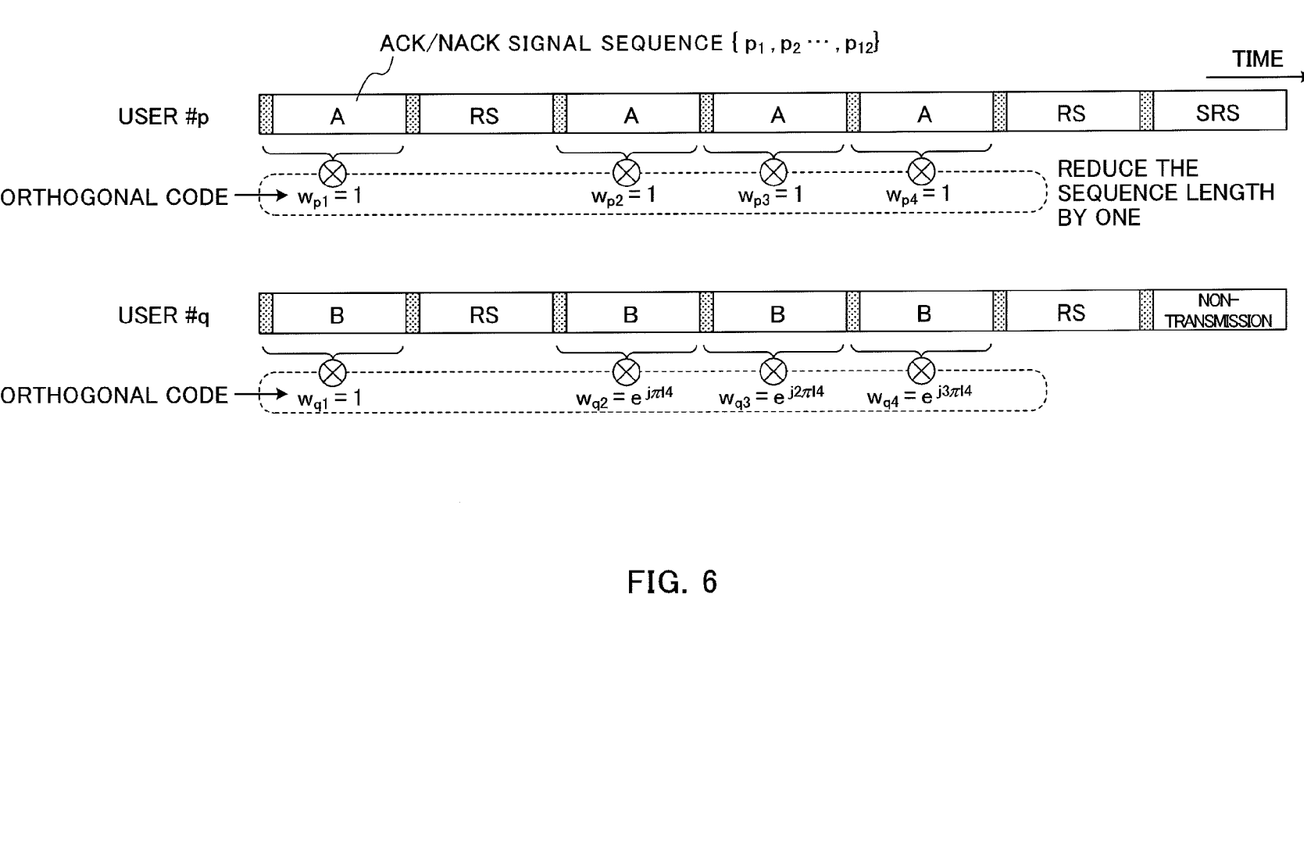
FIG. 6 is a diagram to explain inter-user orthogonality when SRS is multiplexed in code multiplexing on the OCC (orthogonal cover code) base.

FIG. 6 is a conceptual diagram in which the ACK/NACK information is orthogonalized between users by code multiplexing on an OCC base. To a user #p that simultaneously transmits the ACK/NACK information of a plurality of bits and SRS in the same subframe, applied is the (puncture) reduction type format with the last symbol for the ACK/NACK information in the subframe deleted, and the SRS is transmitted in the deleted last symbol position in the subframe. Meanwhile, to a user #q that does not simultaneously transmit the ACK/NACK information of a plurality of bits and SRS in the same subframe, applied is the normal format without the last symbol for the ACK/NACK information in the subframe being deleted, but the last symbol in the subframe is not transmitted. When sequence lengths of OCC vary among users, orthogonality among users deteriorates. To maintain orthogonality, it is necessary to coincide the number of symbols to which the ACK/NACK signal sequence is mapped among users, and for that, one symbol of the user #q who does not transmit the SRS is made non-transmission.

By this means, in the case of orthogonalizing the ACK/NACK information among users by code multiplexing on an OCC base, it is possible to map the SRS to the same subframe to transmit, while maintaining orthogonality among users.

[Number-of-bit Control of ACK/NACK Information in Simultaneously Transmitting PUCCH and PUSCH]

In LTE (Rel. 8), in the case of transmitting ACK/NACK (PUCCH) and data (PUSCH), ACK/NACK (PUCCH) is time-multiplexed into the PUSCH and transmitted.

Figure 7A:
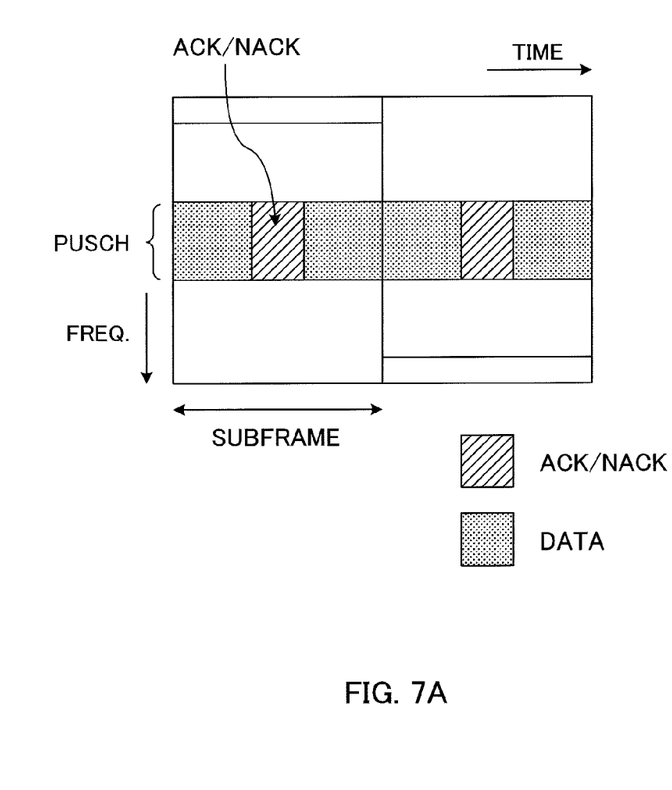
FIG. 7A is a conceptual diagram of a method of time-multiplexing into a PUSCH to simultaneously transmit.
Figure 7B:
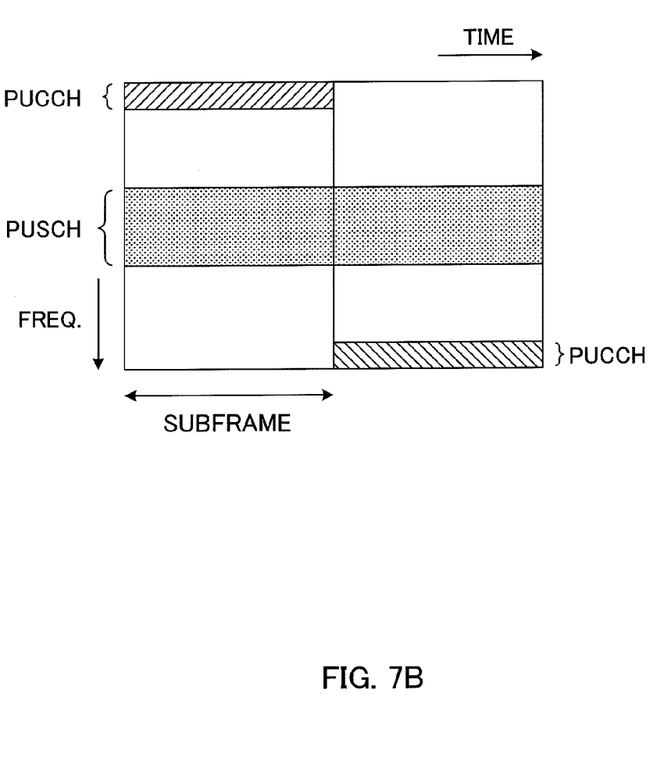
FIG. 7(B) is a conceptual diagram of a method of simultaneously transmitting PUCCH and PUSCH.

In the case of transmitting, in uplink, the ACK/NACK information of a plurality of bits obtained by performing joint-coding on the ACK/NACK information of a plurality of CCs, considered are a method of time-multiplexing into the PUSCH to simultaneously transmit as in LTE (Rel. 8) shown in FIG. 7A and another method of simultaneously transmitting the PUCCH and PUSCH as shown in FIG. 7B. In any of the methods, as the number of information bits of the ACK/NACK information increases, there is a possibility that throughput of data deteriorates.

Still another aspect of the invention is a method of notifying ACK/NACK information while limiting the number of bits of the ACK/NACK information, in the case of performing joint-coding on the ACK/NACK information in response to a downlink data channel among a plurality of CCs to generate the ACK/NACK information of a plurality of bits, and transmitting the ACK/NACK information of a plurality of bits simultaneously with data (PUSCH) in the same subframe in uplink.

By applying spatial bundling, in two-codeword transmission, each state is coded so as to return ACK only in the case that both two codewords are ACK, while returning NACK in the other cases.

By this means, it is possible to reduce the coded data of the ACK/NACK information to two states (1 bit) irrespective of the number of codewords per CC. For example, even when the CC aggregation number is "5", it is possible to limit the maximum number of coded bits to "5" (5 bits).

Alternatively, by applying CC bundling, each state is coded so as to return ACK only in the case that all CCs are ACK, while returning NACK in the other cases.

By this means, it is possible to reduce the coded data of the ACK/NACK information to total 1 to 2 bits irrespective of the number of CCs.

Further, the DTX is deleted, and states are reduced to two states (1 bit) in one-codeword transmission, while being reduced to four states (2 bits) in two-codeword transmission. By this means, even when the number of CCs is "5", it is possible to limit to maximum 10 bits.

(Embodiment 1)

This Embodiment describes the case of orthogonally multiplexing a plurality of users using the cyclic shift of CAZAC code sequences and transmitting an ACK/NACK signal that is feedback control information when the mobile terminal apparatus transmits uplink control information in uplink.

Figure 8:
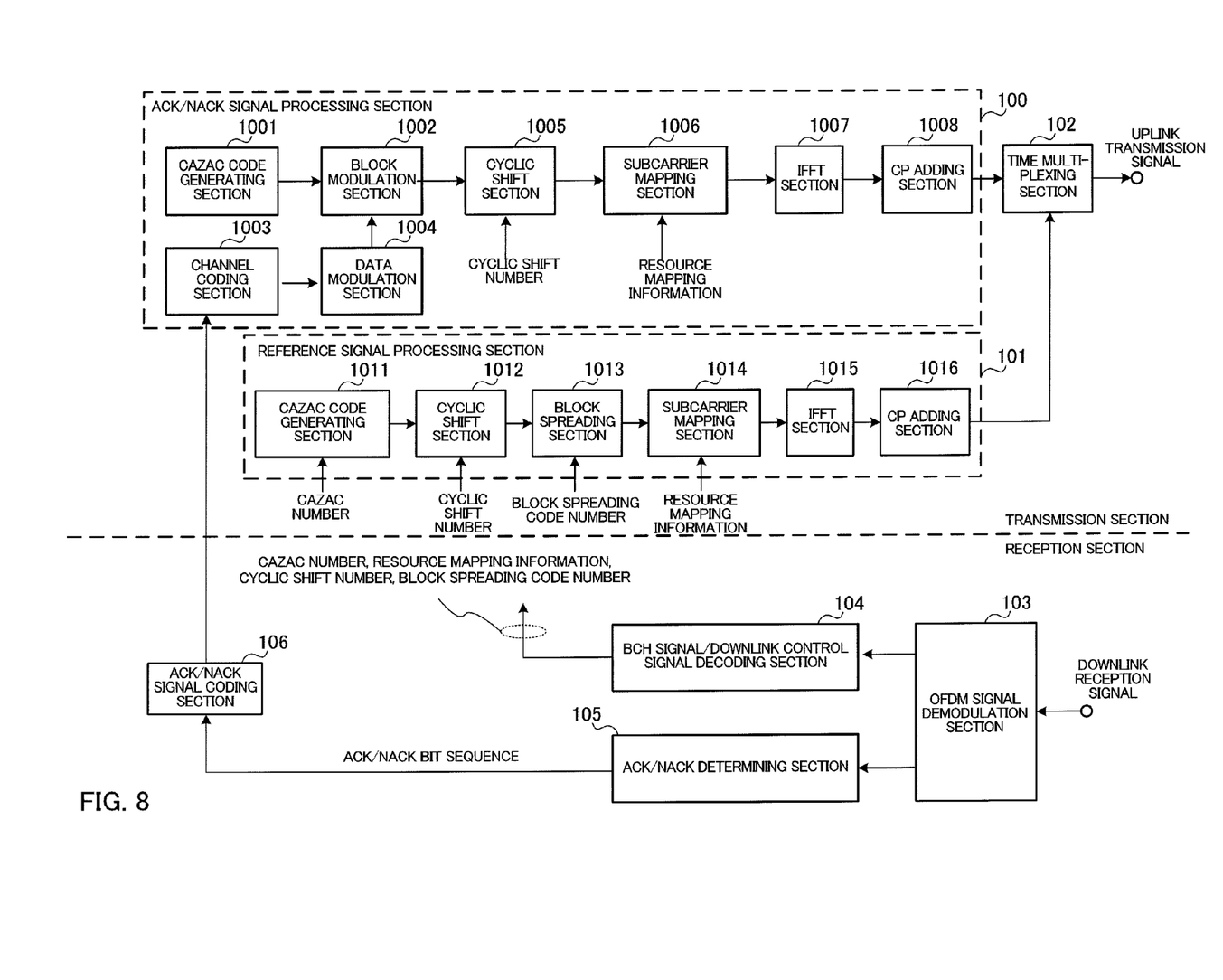
FIG. 8 is a diagram illustrating a schematic configuration of a mobile terminal apparatus according to Embodiment 1 of the invention.

FIG. 8 is a diagram illustrating a schematic configuration of a mobile terminal apparatus according to Embodiment 1 of the invention. The mobile terminal apparatus as shown in FIG. 8 is provided with a transmission section and a reception section. The transmission section is provided with an ACK/NACK signal processing section 100, reference signal processing section 101, and time multiplexing section 102 that time-multiplexes the ACK/NACK signal and reference signal. In addition, a processing block that transmits data (PUSCH) is not shown in functional blocks of the transmission section in the figure, but the data (PUSCH) is multiplexed in the time multiplexing section 102.

The ACK/NACK signal processing section 100 has a CAZAC code generating section 1001 that generates a CAZAC code sequence associated with the CAZAC number, a channel coding section 1003 that performs error correcting coding on the ACK/NACK bit sequence, a data modulation section 1004 that performs data modulation, a block modulation section 1002 that block-modulates the generated CAZAC code sequence with the data-modulated signal, a cyclic shift section 1005 that cyclically shifts the block-modulated signal, a subcarrier mapping section 1006 that maps the cyclically-shifted signal to subcarriers, an IFFT (Inverse Fast Fourier Transform) section 1007 that performs IFFT on the mapped signal, and a CP (Cyclic Prefix) adding section 1008 that adds a CP to the IFFT-processed signal.

The reference signal processing section 101 has a CAZAC code generating section 1011 that generates a CAZAC code sequence associated with the CAZAC number, a cyclic shift section 1012 that cyclically shifts the reference signal comprised of the CAZAC code sequence, a block spreading section 1013 that block-spreads (multiplies an orthogonal code by) the cyclically-shifted signal, a subcarrier mapping section 1014 that maps the block-spread signal to subcarriers, an IFFT section 1015 that performs IFFT on the mapped signal, and a CP adding section 1016 that adds a CP to the IFFT-processed signal. Uplink reference signals include the SRS and RS. The SRS is a reference signal for a base station to estimate a state of an uplink channel of each UE required for scheduling (and timing control), and is multiplexed into the last SC-FDMA symbol of the second slot independently the PUSCH and PUCCH. The RS is multiplexed into the second symbol and sixth symbol of each slot.

The mobile terminal apparatus determines ACK/NACK on a signal received on the downlink shared data channel (PDSCH), and generates an ACK/NACK bit sequence in response to the determination. The data modulation section 1004 of the ACK/NACK signal processing section 100 modulates the coded ACK/NACK bit sequence subjected channel coding in the channel coding section 1003 into a signal of polar coordinate component. The data modulation section 1004 outputs the data-modulated signal to the block modulation section 1002. The CAZAC code generating section 1001 prepares a CAZAC code sequence associated with the CAZAC number assigned to the user. The CAZAC code generating section 1001 outputs the generated CAZAC code sequence to the block modulation section 1002. The block modulation section 1002 block-modulates the CAZAC code sequence for each time block corresponding to one SC-FDMA symbol with the data-modulated control signal. The block modulation section 1002 outputs the block-modulated signal to the cyclic shift section 1005.

The cyclic shift section 1005 cyclically shifts the signal in the time domain by a predetermined cyclic shift amount. In addition, the cyclic shift amount varies with each user, and is associated with the cyclic shift number. The cyclic shift section 1005 outputs the cyclically-shifted signal to the subcarrier mapping section 1006. The subcarrier mapping section 1006 maps the cyclically-shifted signal to subcarriers based on resource mapping information. The subcarrier mapping section 1006 outputs the mapped signal to the IFFT section 1007.

The IFFT section 1007 performs IFFT on the mapped signal to transform into a signal in the time domain. The IFFT section 1007 outputs the IFFT-processed signal to the CP adding section 1008. The CP adding section 1008 adds a CP to the mapped signal. The CP adding section 1008 outputs the CP-added signal to the time multiplexing section 102.

The CAZAC code generating section 1001 of the reference signal processing section 101 prepares a CAZAC code sequence associated with the CAZAC number assigned to the user, and uses as a reference signal. The CAZAC code generating section 1001 outputs the reference signal to the cyclic shift section 1012.

The cyclic shift section 1012 cyclically shifts the reference signal in the time domain by a predetermined cyclic shift amount. In addition, the cyclic shift amount varies with each user, and is associated with the cyclic shift number. The cyclic shift section 1012 outputs the cyclically-shifted reference signal to the block spreading section 1013. The block spreading section (orthogonal code multiplying means) 1013 multiplies (performs block spreading) the cyclically-shifted reference signal by an orthogonal code (OCC) ({1, 1}, {1, −1}). Herein, the OCC (block spreading code number) used in the reference signal may be notified from the higher layer by RRC signaling, or an OCC beforehand associated with the CS of the data symbol may be used. The block spreading section 1013 outputs the block-spread signal to the subcarrier mapping section 1014.

The subcarrier mapping section 1014 maps the signal in the frequency domain to subcarriers based on resource mapping information. The subcarrier mapping section 1014 outputs the mapped reference signal to the IFFT section 1015. The IFFT section 1015 performs IFFT on the mapped signal to transform into a reference signal in the time domain. The IFFT section 1015 outputs the IFFT-processed reference signal to the CP adding section 1016. The CP adding section 1016 adds a CP to the reference signal multiplied by the orthogonal code. The CP adding section 1016 outputs the CP-added reference signal to the time multiplexing section 102.

The time multiplexing section 102 time-multiplexes the uplink control signal from the ACK/NACK signal processing section 100 and the reference signal from the reference signal processing section 101 to be a transmission signal including the uplink control channel signal. In the invention, for a user in which the ACK/NACK information and SRS is simultaneously transmitted (time-multiplexed in the same subframe), the reduction type format with the last symbol in the subframe deleted is applied to the user, and the SRS is inserted in the deleted last symbol position (FIG. 5). For a user in which the SRS is not transmitted simultaneously, even when the subframe has a possibility that another user simultaneously transmits the SRS, the normal format without the last symbol of the subframe being deleted is applied to the user.

As shown in FIG. 5, in the case of the user to which the reduction type format is applied, since symbols to be block-modulated with the ACK/NACK information in one time slot are four symbols, the ACK/NACK signal sequences are $p_1$ to $p_4$ only in the user. In the other user, since symbols to be block-modulated with the ACK/NACK information in one time slot are five symbols, the ACK/NACK signal sequences are $q_1$ to $q_5$.

The reception section has an OFDM signal demodulation section 103 that demodulates an OFDM signal, a BCH (Broadcast Channel) signal/downlink control signal decoding section 104 that decodes a BCH signal and downlink control signal, an ACK/NACK determining section 105 that determines ACK/NACK from a downlink signal, and an ACK/NACK signal coding section 106.

The OFDM signal demodulation section 103 receives a downlink OFDM signal to demodulate. In other words, the section 103 removes the CP from the downlink OFDM signal, performs Fast Fourier Transform, extracts subcarriers assigned the BCH signal or downlink control signal, and performs data demodulation. The OFDM signal demodulation section 103 outputs the data-demodulated signal to the BCH signal/downlink control signal decoding section 104. Further, the OFDM signal demodulation section 103 outputs the downlink signal to the ACK/NACK signal determining section 105.

The BCH signal/downlink control signal decoding section 104 decodes the data-demodulated signal, and obtains the CAZAC number, resource mapping information (including the resource block number), the cyclic shift number, and the block spreading code number. The BCH signal/downlink control signal decoding section 104 outputs the CAZAC number to the CAZAC code generating sections 1001 and 1011, outputs the resource mapping information to the subcarrier mapping sections 1006 and 1014, outputs the cyclic shift number to the cyclic shift sections 1005 and 1012, and outputs the block spreading code number (OCC number) to the block spreading section 1013.

The ACK/NACK determining section 105 determines whether or not the received downlink shared data channel signal (PDSCH signal) is received without error, and outputs each state of ACK when the downlink shared data channel signal is received without error, NACK when an error is detected, and DTX when the downlink shared data channel signal is not detected as a determination result. The ACK/NACK determining section 105 makes a determination about the above-mentioned three states for each codeword. In two-codeword transmission, the above-mentioned three states are determined for each codeword. When a plurality of CCs is assigned in communications with the base station, the section 105 determines whether or not the downlink shared data channel signal is received without error for each CC.

The ACK/NACK signal coding section 106 receives the determination result that the ACK/NACK signal determining section 105 determines for each codeword. The ACK/NACK signal coding section 106 is capable of coding the determination result using the coding table as shown in FIG. 3. In the case of one codeword, information bits are individually assigned to three states of ACK, NACK and DTX. When the determination result is DTX, the result is coded to "00". When the determination result is NACK, the result is coded to "01". When the determination result is ACK, the result is coded to "10". In the case of two codewords, coded bits of a state related to DTX are deleted. In the coding table (case of two codewords) in FIG. 3, ACK/ACK represents that each of determination results of two codewords is ACK, and ACK/NACK represents that the determination result of one codeword is ACK and that the determination result of the other codeword is NACK. Further, NACK/ACK represents that the determination result of one codeword is NACK and that the determination result of the other codeword is ACK. Information bits are individually assigned to these three states. Meanwhile, information bits are not defined individually for DTX. One type of information bits (00) are assigned to each of states DTX/ACK, DTX/NACK, ACK/DTX, NACK/DTX, DTX/DTX, and NACK/NACK. Since the occurrence probability of DTX or NACK/NACK is low, retransmission is performed in the same handling as NACK/NACK. The state of DTX/DTX may be made non-transmission as in LTE.

Thus, in the case that the determination result of at least one codeword includes DTX, the same information bits as NACK/NACK are assigned in all cases, the number of states allowed to be notified is thereby limited to four (states), and the maximum number of bits of coded data of the NACK/NACK information is suppressed.

Alternatively, only in the case that the number of CCs is a predetermined number X or less, information bits are defined individually for DTX, and in the case that the number of CCs is larger than the predetermined number and that two codewords are used, information bits may not be defined for DTX alone. For example, the ACK/NACK signal coding section 106 defines that the threshold X of the number of CCs is "4" (X=4). In the case that the number of CCs is "4" or less, when the number of codewords is "2" (2 codewords), it is possible to notify five states. Meanwhile, in the case that the number of CCs exceeds the threshold X and is "5", when the number of codewords is "2" (2 codewords), four states are notified. The maximum number of bits in this case is 10 bits (=2×5).

Further, when the ACK/NACK information is transmitted simultaneously with the data (PUSCH) in the same subframe in uplink, the number of bits of the ACK/NACK information may be limited. In the case of two codewords, for each CC, the ACK/NACK signal coding section 106 assigns an information bit (for example, "0") of ACK to ACK/ACK of a state in which two codewords are both ACK, while assigning an information bit (for example, "1") of NACK to all states except ACK/ACK. By this means, states capable of being notified per CC are decreased to two states (1 bit) irrespective of the number of codewords.

Alternatively, for a plurality of CCs, the ACK/NACK signal coding section 106 may assign an information bit (for example, "0") only in the case that determination results of all CCs are ACK, while assigning an information bit (for example, "1") of NACK to all states except ACK/ACK. By this means, irrespective of the number of CCs, it is possible to reduce the ACK/NACK information to total 1 to 2 bits.

Meanwhile, in order not to assign any information bit to determination results including DTX, the ACK/NACK signal coding section 106 may assign two states (1 bit) of ACK and NACK in one codeword, while assigning information bits of 2 bits to four states (2 bits) of ACK/ACK, ACK/NACK, NACK/ACK and NACK/NACK in two codewords.

The ACK/NACK signal coding section 106 decreases the number of bits of the ACK/NACK information as described above, and then, collectively codes the ACK/NACK information of a plurality of CCs. The method of collectively coding the ACK/NACK information of a plurality of CCs is not limited in the invention. In addition, in the case that the CC aggregation number is "1", the ACK/NACK information coded by the above-mentioned technique is used without any modification.

Figure 9:
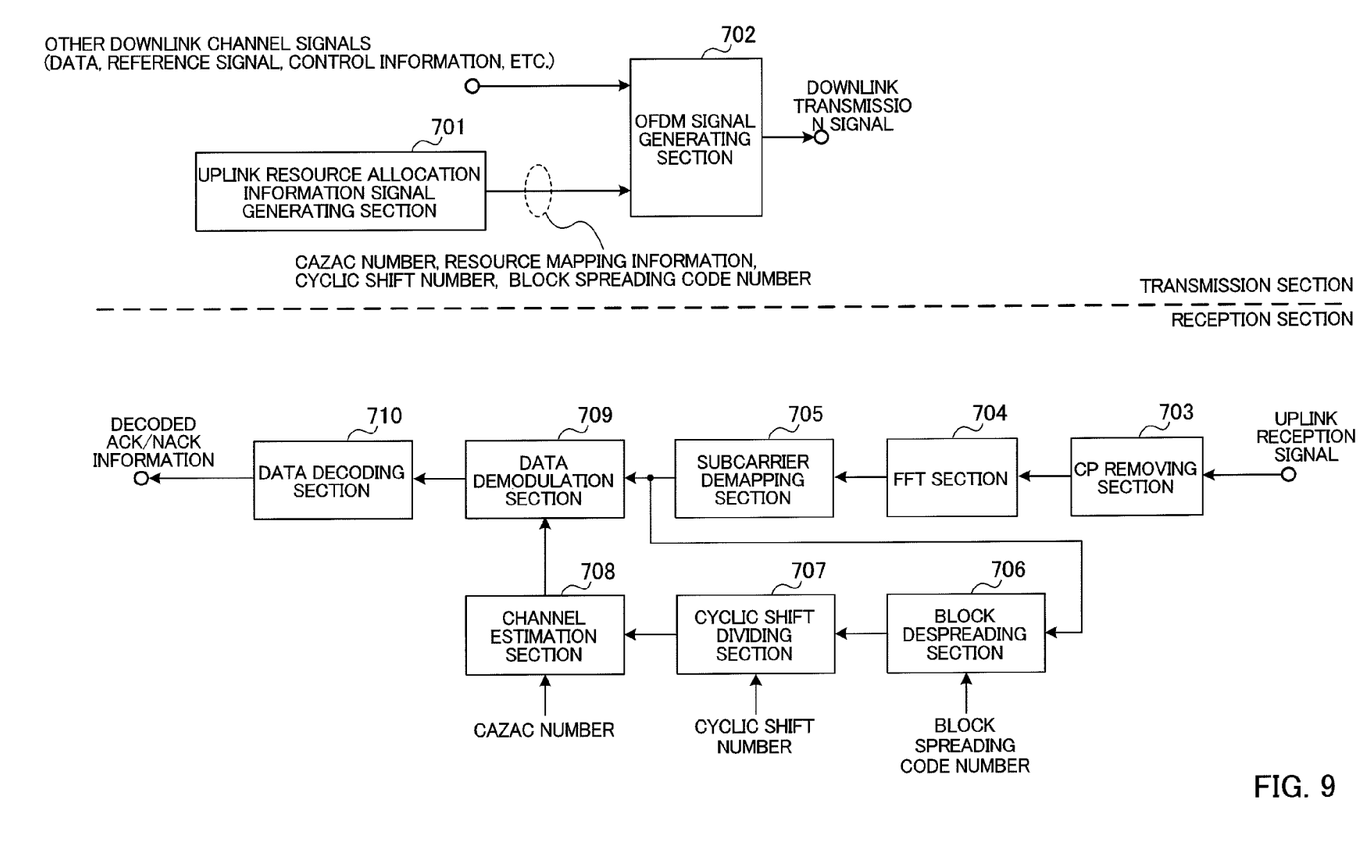
FIG. 9 is a diagram illustrating a schematic configuration of a radio base station apparatus according to Embodiments 1 and 2 of the invention.

FIG. 9 is a diagram illustrating a schematic configuration of the radio base station apparatus according to Embodiment 1 of the invention. The radio base station apparatus as shown in FIG. 9 is provided with a transmission section and a reception section. The transmission section has an uplink resource allocation information signal generating section 701, and an OFDM signal generating section 702 that multiplexes other downlink channel signals and uplink resource allocation information signal to generate an OFDM signal. The other downlink channel signals include data, reference signal, control signal, etc. and the uplink resource allocation information signal includes the CAZAC number, resource mapping information, the cyclic shift number and the block spreading code number (OCC number).

In addition, the CAZAC number, resource mapping information, the cyclic shift number and the block spreading code number (OCC number) may be transmitted to the mobile terminal apparatus on the BCH, or may be transmitted to the mobile terminal apparatus on the downlink control channel (PDCCH: Physical Downlink Control Channel). Alternately, the CAZAC number, resource mapping information, the cyclic shift number and the block spreading code number (OCC number) may be notified to the mobile terminal apparatus by a higher layer.

The OFDM signal generating section 702 maps the downlink signal including the other downlink channel signals and uplink resource allocation information signal to subcarriers, performs Inverse Fast Fourier Transform (IFFT), adds a CP, and thereby generates a downlink transmission signal.

The reception section has a CP removing section 703 that removes the CP from a reception signal, an FFT section 704 that performs Fast Fourier Transform (FFT) on the reception signal, a subcarrier demapping section 705 that demaps the FFT-processed signal, a block despreading section 706 that despreads the subcarrier-demapped signal by a block spreading code (OCC), a cyclic shift dividing section 707 that cancels the cyclic shift from the despread signal to divide into a signal of a targeted user, a channel estimation section 708 that performs channel estimation on the demapped signal subjected to user division, a data demodulation section 709 that performs data demodulation on the subcarrier-demapped signal using a channel estimation value, and a data decoding section 710 that performs data decoding on the data-demodulated signal.

The CP removing section 703 removes a portion corresponding to the CP and extracts an effective signal portion. The CP removing section 703 outputs the CP-removed signal to FFT section 704. The FFT section 704 performs FFT on the reception signal to transform into a signal in the frequency domain. The FFT section 704 outputs the FFT-processed signal to the subcarrier demapping section 705.

The subcarrier demapping section 705 extracts an ACK/NACK signal that is an uplink control channel signal from the signal in the frequency domain using the resource mapping information. The subcarrier demapping section 705 outputs the extracted ACK/NACK signal to the data demodulation section 709. The subcarrier demapping section 705 outputs the extracted reference signal to the block despreading section 706.

The block despreading section 706 despreads the reception signal subjected to block spreading i.e. orthogonal multiplexing using the orthogonal code (OCC) (block spreading code), using the orthogonal code ({1, 1}, {1, −1}) used in the mobile terminal apparatus. The block despreading section 706 outputs the despread signal to the cyclic shift dividing section 707.

The cyclic shift dividing section 707 divides the control signals subjected to orthogonal multiplexing using the cyclic shift, using the cyclic shift number. The uplink control channel signal from the mobile terminal apparatus is cyclically shifted with a different cyclic shift amount for each user. Accordingly, by cyclically shifting in the opposite direction by the same cyclic shift amount as the cyclic shift amount performed in the mobile terminal apparatus, it is possible to isolate the control signal of the user targeted for the reception processing. The cyclic shift dividing section 707 outputs the signal subjected to user division to the channel estimation section 708.

The channel estimation section 708 divides the reference signal subjected to orthogonal multiplexing using the cyclic shift and orthogonal code, using the cyclic shift number, and when necessary, the OCC number. The channel estimation section 708 performs the cyclic shift in the opposite direction using the cyclic shift amount associated with the cyclic shift number. Further, the section 708 performs despreading using the orthogonal code associated with the OCC number. By this means, it is possible to isolate the signal (reference signal) of the user. Furthermore, the channel estimation section 708 extracts the received reference signal from the signal in the frequency domain using the resource mapping information. Then, the section 708 calculates correlation between the CAZAC code sequence associated with the CAZAC number and the received CAZAC code sequence, and thereby performs channel estimation.

The data demodulation section 709 performs data demodulation on the ACK/NACK signal to output to the data decoding section 710. At this point, the data demodulation section 709 performs data demodulation based on the channel estimation value from the channel estimation section 708. Further, the data decoding section 710 performs data decoding on the demodulated ACK/NACK signal to output as the ACK/NACK information. When ACK/NACK signals of a plurality of CCs are collectively coded, the data decoding section 710 decodes the ACK/NACK signals for each CC, and further decodes the ACK/NACK information that are coded for each CC. When the mobile terminal apparatus performs coding using the coding table as shown in FIG. 3, the section 710 performs decoding using the same coding table. The data demodulation section 709 performs decoding by the decoding method corresponding to the coding method of the ACK/NACK information in the mobile terminal apparatus.

(Embodiment 2)

This Embodiment describes the case of orthogonally multiplexing a plurality of users using block spreading and transmitting an ACK/NACK signal that is feedback control information when a mobile terminal apparatus transmits uplink control information in uplink.

Figure 10:
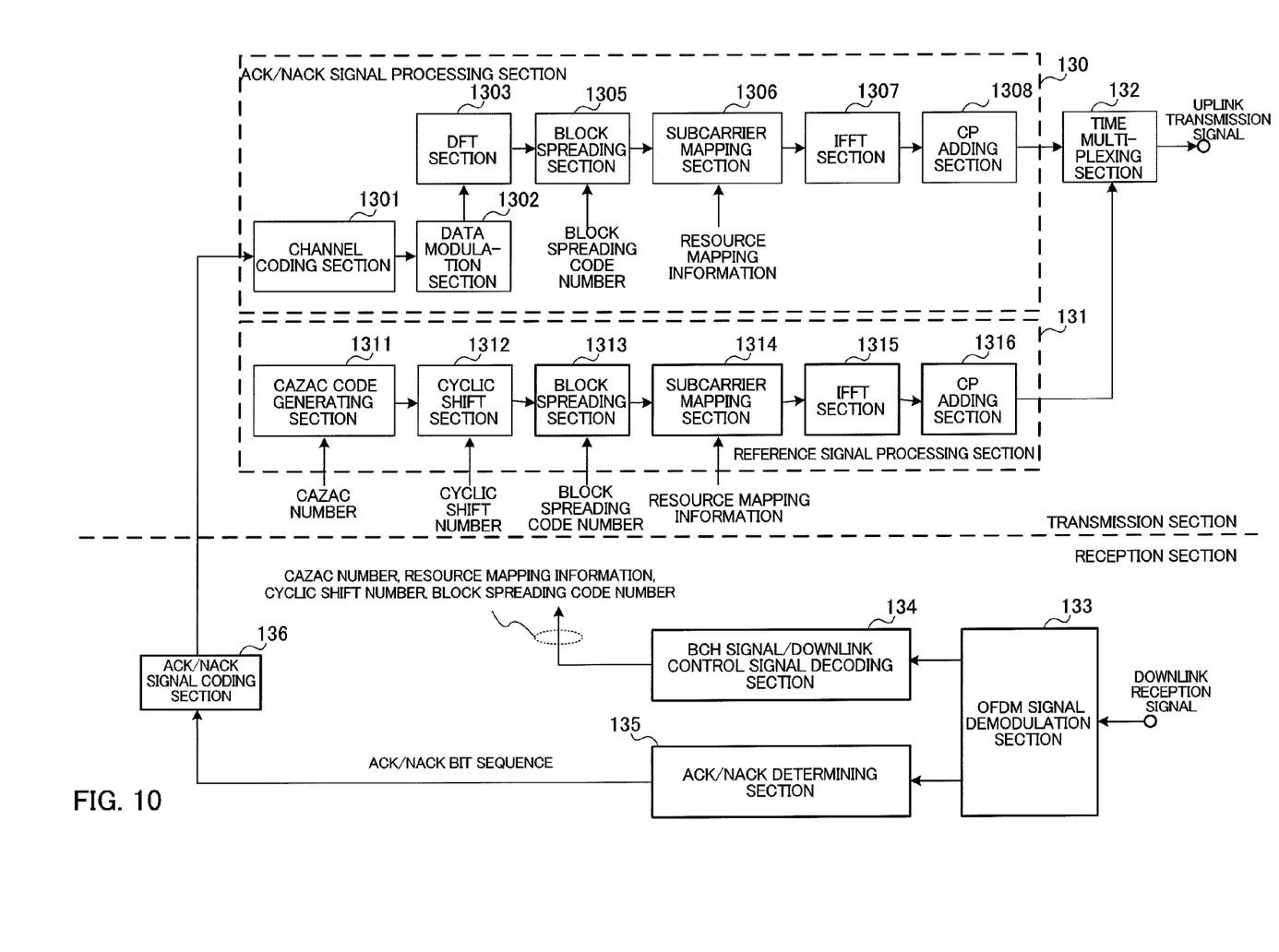
FIG. 10 is a diagram illustrating a schematic configuration of a mobile terminal apparatus according to Embodiment 2 of the invention.

FIG. 10 is a diagram illustrating a schematic configuration of a mobile terminal apparatus according to Embodiment 2 of the invention. The mobile terminal apparatus as shown in FIG. 10 is provided with a transmission section and a reception section. The transmission section is provided with an ACK/NACK signal processing section 130, reference signal processing section 131, and time multiplexing section 132 that time-multiplexes the ACK/NACK signal and reference signal. In addition, a processing block that transmits data (PUSCH) is not shown in functional blocks of the transmission section in the figure, but the data (PUSCH) is multiplexed in the time multiplexing section 132.

The ACK/NACK signal processing section 130 has a channel coding section 1301 that performs error correcting coding on an ACK/NACK bit sequence, a data modulation section 1302 that performs data modulation on the ACK/NACK bit sequence, a DFT (Discrete Fourier Transform) section 1303 that performs DFT on the data-modulated signal, a block spreading section 1305 that performs block-spreading on the DFT-processed signal by a block spreading code, a subcarrier mapping section 1306 that maps the block-spread signal to subcarriers, an IFFT section 1307 that performs IFFT on the mapped signal, and a CP adding section 1308 that adds a CP to the IFFT-processed signal. In addition, the data modulation section 1302, subcarrier mapping section 1306, IFFT section 1307 and CP adding section 1308 are respectively the same as the data modulation section 1004, subcarrier mapping section 1006, IFFT section 1007 and CP adding section 1008 in Embodiment 1, and therefore, specific descriptions thereof are omitted.

The reference signal processing section 131 has a CAZAC code generating section 1311 that generates a CAZAC code sequence associated with the CAZAC number, a cyclic shift section 1312 that cyclically shifts the reference signal comprised of the CAZAC code sequence, a block spreading section 1313 that performs block-spreading on the cyclically-shifted signal by a block spreading code, a subcarrier mapping section 1314 that maps the block-spread signal to subcarriers, an IFFT section 1315 that performs IFFT on the mapped signal, and a CP adding section 1316 that adds a CP to the IFFT-processed signal. In addition, the CAZAC code generating section 1311, cyclic shift section 1312, block spreading section 1313, subcarrier mapping section 1314, IFFT section 1315 and CP adding section 1316 are the same as the CAZAC code generating section 1011, cyclic shift section 1012, block spreading section 1013, subcarrier mapping section 1014, IFFT section 1015 and CP adding section 1016, and therefore, specific descriptions thereof are omitted.

Since signals (12 subcarriers) corresponding to one symbol are generated after DFT, the block spreading sections 1305, 1313 generate the signals corresponding to a plurality of symbols, and then, multiply by the orthogonal code. As shown in FIG. 6, the block spreading code W varies with each user, and is associated with the block spreading code number. Further, the block spreading section 1313 multiplies the cyclically-shifted reference signal by the block spreading code (orthogonal code (OCC) ($\{1, 1\}$, $\{1, -1\}$)). Herein, for the OCC used in the reference signal, it is preferable to use an OCC beforehand associated with the block spreading code of the data symbol. The block spreading sections 1305 and 1313 output the block-spread signals to the subcarrier mapping sections 1306 and 1314, respectively.

The reception section has an OFDM signal demodulation section 133 that demodulates an OFDM signal, a BCH signal/downlink control signal decoding section 134 that decodes a BCH signal and downlink control signal, an ACK/NACK determining section 135 that determines whether a downlink shared channel signal (PDSCH (Physical Downlink Shared CHannel)) is received without error, and an ACK/NACK signal coding section 136. In addition, the OFDM signal demodulation section 133 and BCH signal/downlink control signal decoding section 134 are the same as the OFDM signal demodulation section 103 and BCH signal/downlink control signal decoding section 104 in Embodiment 1, and therefore, specific descriptions thereof are omitted.

The ACK/NACK determining section 135 determines whether or not the received downlink shared data channel signal (PDSCH signal) is received without error, and outputs the determination result. The determination result is of three states of ACK, NACK and DTX bits. The ACK/NACK determining section 135 outputs the determination result of ACK/NACK/DTX to the ACK/NACK signal coding section 136. When downlink shared data channel signals are received parallel in a plurality of CCs, the above-mentioned three states are determined for each CC.

The ACK/NACK signal coding section 136 receives the determination result that the ACK/NACK signal determining section 135 determines for each codeword. The ACK/NACK signal coding section 136 has the same function as the ACK/NACK signal coding section 106 in Embodiment 1. In other words, the section 136 reduces the states output for each CC from the ACK/NACK signal determining section 135 in response to a plurality of downlink shared data channel signals received parallel in a plurality of CCs to the number of states capable being notified individually, and collectively codes the states.

The ACK/NACK signal processing section 130 is given the ACK/NACK information coded with the maximum number of coded bits limited in the ACK/NACK signal coding section 136. The channel coding section 1301 performs error correcting coding on the ACK/NACK information, then replicates by the number of symbols assigned to one slot, and outputs the replicated ACK/NACK information ($p_1$ to $p_{12}$ in FIG. 6) sequentially to the data modulation section 1302. The DFT section 1303 transforms the ACK/NACK information in the time domain into the frequency domain, and enter replicated symbols are multiplied by the orthogonal codes ($W_{p1}$ to $W_{p4}$), and are thus orthogonalized between users.

At this point, as shown in FIG. 6, when the SRS is transmitted in the same subframe as the ACK/NACK information, applied is the reduction type format with the last symbol of the subframe deleted. The SRS is inserted in the end (position of the deleted last symbol) of the reduction type format and transmitted.

Meanwhile, in the format of the other user who does not transmit the SRS, the last symbol in the same position as the SRS is set at non-transmission. Therefore, in order for the other user #q not to transmit the ACK/NACK information in the last symbol of the subframe in which the user #p transmits the SRS, the radio base station apparatus provides instructions to the other user #q by UL grant. Further, the radio base station apparatus instructs all users, #p and #q, to decrease the sequence length of orthogonal codes Wp and Wq by one by UL grant. By this means, the sequence lengths of orthogonal codes multiplied by the ACK/NACK information are identical among a plurality of users, and orthogonality is maintained between users.

The BCH signal/downlink control signal decoding section 134 decodes the data-demodulated signal, and obtains the CAZAC number, resource mapping information (including the resource block number), the cyclic shift number, and the block spreading code number. The BCH signal/downlink control signal decoding section 134 outputs the CAZAC number to the CAZAC code generating section 1311, outputs the resource mapping information to the subcarrier mapping sections 1306 and 1314, outputs the cyclic shift number to the cyclic shift section 1312, and outputs the block spreading code number to the block spreading sections 1305 and 1313.

In the mobile terminal apparatus configured as described above, the ACK/NACK bit sequence output from the ACK/NACK determining section 135 is coded in the ACK/NACK signal coding section 136 with the maximum number of coded bits limited as in Embodiment 1. In the case of a plurality of CCs, the ACK/NACK information is collectively coded.

Without departing from the scope of the present invention, the number of processing sections and processing procedures in the above-mentioned descriptions are capable of being carried into practice with modifications thereof as appropriate. Further, each element shown in the figures represents the function, and each functional block may be actualized by hardware or may be actualized by software. Moreover, the invention is capable of being carried into practice with modifications thereof as appropriate without departing from the scope of the invention.

The present application is based on Japanese Patent Application No. 2010-141020 filed on Jun. 21, 2010, entire content of which is expressly incorporated by reference herein.

The invention claimed is:

1. A mobile terminal apparatus comprising:
   an ACK/NACK signal coding section configured to perform joint-coding on ACK/NACK information in response to downlink shared data channel signals among a plurality of base frequency blocks to generate plural-bit ACK/NACK information;
   a channel coding section configured to channel-coding on the plural-bit ACK/NACK information;
   a DFT (Discrete Fourier Transform) section configured to perform DFT on a channel-coded signal; and
   a block spreading section configured to perform block spreading on the channel-coded signal using a block spreading code,
   wherein, when the plural-bit ACK/NACK information is to be transmitted in a subframe where a symbol to transmit an SRS (Sound Reference Signal) for channel quality measurement is time-multiplexed, the block spreading section applies a shortened format with one of symbols for ACK/NACK information punctured in the subframe, and when the plural-bit ACK/NACK information is to be transmitted in a subframe with no symbol to transmit the SRS, the block spreading section applies a normal format with no puncture in symbols.

2. The mobile terminal apparatus according to claim 1, wherein the ACK/NACK signal coding section assigns information bits individually to three states of ACK, NACK and DTX per base frequency block in a case of one-codeword transmission, while not assigning information bits to DTX alone to reduce a number of states in a case of two-codeword transmission.

3. The mobile terminal apparatus according to claim 1, wherein the ACK/NACK signal coding section assigns information bits to DTX alone only in a case that a number of base frequency blocks is a predetermined value or less, while not assigning information bits to DTX alone to reduce a number of states in a case that the number of base frequency blocks is more than the predetermined value.

4. The mobile terminal apparatus according to claim 1, further comprising a multiplexing section configured to multiplex the ACK/NACK information to first, third to fifth and seventh symbols and multiplex reference signals to second and sixth symbols.

5. The mobile terminal apparatus according to claim 1, wherein the ACK/NACK signal coding section collectively code states ACK, NACK, and DTX in response to a plurality of downlink shared data channel signals received parallel in the plurality of base frequency blocks, after reducing a number of states allowed to be notified individually for the base frequency blocks.

6. A radio communication method between a mobile terminal apparatus and a radio base station apparatus, comprising the steps of:
   perform joint-coding on ACK/NACK information in response to downlink shared data channel signals among a plurality of base frequency blocks to generate plural-bit ACK/NACK information;
   channel-coding on the plural-bit ACK/NACK information; and
   performing DFT (Discrete Fourier Transform) and block spreading using a block spreading code on a channel-coded signal,
   wherein, when the plural-bit ACK/NACK information is to be transmitted in a subframe where a symbol to transmit an SRS (Sounding Reference Signal) for channel quality measurement is time-multiplexed, a shortened format with one of symbols for ACK/NACK information punctured in the subframe is applied, and when the plural-bit ACK/NACK information is to be transmitted in a subframe with no symbol to transmit the SRS, a normal format with no puncture in symbols is applied.

7. The radio communication method according to claim 6, where the ACK/NACK information is multiplexed to first, third to fifth, and seventh symbols and reference signals are multiplexed to second and sixth symbols.

8. A radio communication system comprising a mobile terminal apparatus and a radio base station apparatus,
the mobile terminal apparatus comprising:
an ACK/NACK signal coding section configured to perform joint-coding on ACK/NACK information in response to downlink shared data channel signals transmitted from the radio base station apparatus, among a plurality of base frequency blocks to generate plural-bit ACK/NACK information;
a channel coding section configured to channel-coding on the plural-bit ACK/NACK information;
a DFT (Discrete Fourier Transform) section configured to perform DFT on a channel-coded signal and a block spreading section configured to perform block spreading on the channel-coded signal using a block spreading code,
wherein, when the plural-bit ACK/NACK information is to be transmitted in a subframe where a symbol to transmit an SRS (Sounding Reference Signal) for channel quality measurement is time-multiplexed, the block spreading section applies a shortened format with one of symbols for ACK/NACK information punctured in the subframe, and when the plural-bit ACK/NACK information is to be transmitted in a subframe with no symbol to transmit the SRS, the block spreading section applies a normal format with no puncture in symbols.

9. The radio communication system according to claim 8, wherein the mobile terminal apparatus multiplexes the ACK/NACK information to first, third to fifth, and seventh symbols and multiplexes reference signals to second and sixth symbols.

\* \* \* \* \*